US 6,576,132 B2
Jun. 10, 2003

(12) United States Patent
Kurukchi et al.

(54) QUENCH WATER PRETREAT PROCESS

(75) Inventors: Sabah Kurukchi, Houston, TX (US); Joseph Gondolfe, Cypress, TX (US)

(73) Assignee: Stone & Webster Process Technology, Inc., Houston, TX (US)

( * ) Notice: Subject to any disclaimer, the term of this patent is extended or adjusted under 35 U.S.C. 154(b) by 0 days.

(21) Appl. No.: 10/075,037

(22) Filed: Feb. 12, 2002

(65) Prior Publication Data

US 2002/0153310 A1 Oct. 24, 2002

Related U.S. Application Data

(60) Provisional application No. 60/269,213, filed on Feb. 16, 2001.

(51) Int. Cl.⁷ ............................ B01D 11/00; B01D 19/00
(52) U.S. Cl. ........................ 210/634; 210/774; 210/806; 95/264; 585/809; 585/833
(58) Field of Search ..................... 210/635, 774, 210/804, 805, 806; 95/241, 263, 264; 208/187, 188; 585/809, 833

(56) References Cited

U.S. PATENT DOCUMENTS

| | | | |
|---|---|---|---|
| 3,492,222 A | * | 1/1970 | Van Tassell |
| 3,507,782 A | | 4/1970 | Strausser et al. |
| 3,868,094 A | | 2/1975 | Hovis |
| 3,878,094 A | | 4/1975 | Conley et al. |
| 4,009,218 A | * | 2/1977 | Uitti |
| 4,336,129 A | | 6/1982 | Yoshimura et al. |
| 4,800,025 A | | 1/1989 | Bibaeff |
| 4,802,978 A | | 2/1989 | Schmit et al. |
| 5,080,802 A | | 1/1992 | Cairo, Jr. et al. |
| 5,656,173 A | | 8/1997 | Jordan et al. |
| 6,120,650 A | | 9/2000 | Nye et al. |
| 6,395,952 B1 | * | 5/2002 | Barchas .................. 585/833 |

OTHER PUBLICATIONS

Koenig & Banerjee "Quench Water Clean–Up" 1992 AICHE Spring Meeting Mar. 31, 1992—Paper 86b 28 pages. Fourth Annual Ethylene Producers Conference, New Orleans, LA.

Mullenix, Moyer & Wittman, "DOX Unit Operating Experience in Vista's Ethane Cracker" Paper No. 17C, 1993 AICHE Spring Meeting Mar. 31, 1993, 21 pages. Fifth Annual Ethylene Producers Conference—Houston, TX.

Guyot, Balouet, Wines and Bretelle "Increase Ethylene Processing Capacity and Efficiency with Improved Liquid/Liquid Separation," 16 pages, Undated.

Cockshutt and Dennehy, "Methods for Successful Process Selection for Quench Water Cleanup" Paper No. 17D. Prepared for Presentation AICHE spring Meeting—Houston, TX. 15 pages, Undated.

* cited by examiner

Primary Examiner—Joseph Drodge
(74) Attorney, Agent, or Firm—Hedman & Costigan, P.C.

(57) ABSTRACT

A process for pretreating a oily/water stream for closed loop dilution steam production within an ethylene plant using countercurrent multi-stage extraction to remove both free and dissolved organic solutes from in-situ (net) quench water with an organic solvent to yield an aqueous raffinate containing only residual amounts of organic solute. The raffinate is steam stripped to remove the residual organic solutes, yielding a pretreated quench water stream substantially free of organic material. The pretreated quench water is suitable for reuse to generate dilution steam (without fouling). The (solvent) extract from extraction is regenerated in a solvent regenerator having an overhead stream for purging light ends, a bottom stream for purging heavy ends, and a heart-cut side stream for recycling solvent to the extractor. Alternatively, solvent may be taken as a heart-cut or equivalent from an existing ethylene and/or refinery plant process stream, once passed through the multi-stage solvent extraction unit, and then returned to the processing unit of the plant from which it was taken.

21 Claims, 2 Drawing Sheets

QUENCH WATER PRETREAT PROCESS

CROSS REFERENCE TO RELATED APPLICATIONS

This application claims priority from U.S. Provisional Application Serial No. 60/269,213, filed on Feb. 16, 2001.

FIELD OF THE INVENTION

This invention relates to a method for treatment of a net quench water stream and in particular to treatment of same stream for removal of organic contaminants prior to its disposal to the environment or its reuse for dilution steam generation required in ethylene plants.

BACKGROUND OF THE INVENTION

Base petrochemicals, such as ethylene and propylene, are largely produced by steam cracking of saturated hydrocarbon (H/C) feedstocks. In the endothermic cracking process, H/C plus steam diluent are decomposed between 750° C. and 900° C. by fundamental free radical reactions initiated by the rupture of the C—C covalent bond. Beyond the primary reaction products of ethylene and propylene, many other co-products are also produced in varying quantities including $H_2$, paraffins, olefins, acetylenes, diolefins, cyclics, aromatic compounds and coke together with CO, $CO_2$, $H_2S$ and a series of organic sulfur compounds. The composition of the pyrolysis effluent cracked gas (CG) varies with feedstock composition and severity of steam cracking.

The low molecular weight pyrolysis effluent products are reactive at high temperatures and will undergo further reaction to less desirable secondary reaction products unless the reaction temperature is rapidly reduced to below about 200° C. The hot furnace CG is therefore rapidly cooled in Transfer Line Exchanger (TLE) that generates very high pressure (VHP) steam used for power production within the ethylene plant.

For gaseous feedstocks (ethane, propane and butanes), a Quench Oil Tower (QOT) is not required because only small amounts of $C5^+$ liquids are produced. For these feedstock types, a simple Quench Water Tower (QWT) is used to cool the effluent gas from the TLE.

The CG is cooled in the bottom of the QWT to near its adiabatic saturation temperature causing condensation of tars and other heavy oily components in the CG. The CG is further cooled by contact with recirculating quench water (QW) as it flows up the QWT, thereby condensing most of the dilution steam and part of the H/C in the CG. The recirculating QW leaving the QWT carries all condensed H/C components both dissolved and separate phase in the form of tars and oils as well as coke and complex oligomers and emulsions.

Water is highly suitable for quenching purposes because it is both an effective heat transfer media and inexpensive. The employment of water in the quenching operation, however, has one great attendant disadvantage, after treating the furnace cracked gas with water, the quench medium contains significant amounts of dissolved and emulsified hydrocarbon oils, as well as heavy tar-like polymers and coke particulate matter. The oils are comprised of aromatic hydrocarbons and light polymers. These materials form stable oil/water emulsions when the cracked gas stream is intimately mixed with the quench water. The resulting emulsions comprise from about 2000 to more than 6000 parts oil per million parts emulsion. The stability of the emulsion is apparently due, at least in part, to a mutual affinity between the unsaturated hydrocarbon components in the dispersed oil phase and the continuous aqueous phase. Thus, the emulsion will resist efforts to separate it sharply into its various phases.

The QW from the bottom of the QWT is settled in an Oil-Water Separator (O/WS) that has three compartments in series separated by weirs, the heavy tar and solids is withdrawn from the $1^{St}$ compartment, the raw QW from the $2^{nd}$ and the light pyrolysis gasoline from the $3^{rd}$ respectively.

The raw QW, from the O/WS, still contains residual fine particle solids, unsettled free oil, emulsified oil, and dissolved H/C's. Most (90–95%) of this raw QW at 90° C. is recirculated for low-level heat recovery in the plant before returning to the QWT. The net (discharge) raw QW is either: (1) used to generate dilution steam for steam cracking as a closed loop system, or (2) purged to battery limits as an open-loop system.

This net raw QW discharge can be pretreated to remove the residual suspended solids, and free and emulsified oil in order to prevent and/or reduce fouling in a downstream closed dilution steam generation system. On the other hand, if the excess raw water were simply purged to battery limits, it would be desirable to purify this water to such an extent that it could be discharged into local streams without causing pollution. Sufficient impurities present in the wastewater would adversely affect riverways, oceans, aquifers, fish and other wildlife.

Because ethylene plants cracking gas feedstocks do not have a QOT prior to the QWT, quench water in these plants is characterized by being more fouling service and more susceptible to emulsion formation than its counterpart in liquid cracking plants. A particular problem is the entrainment of fouling species in the quench water slipstream to the dilution steam generator (DSG).

The feed to the QWT is the furnace cracked gas. The QWT is also a dump for many other recycled streams, both continuous and intermittent, which may cause changes in the surface properties of the water as well as its pH. A low pH (<4.5) or a high pH (>9.5) makes it difficult to separate the emulsified oil. In addition, a low pH raises corrosion concerns, and a high pH increases foaming tendencies and causes difficulties in oil/water separation.

Spalled coke and coke fines from furnace transient (decoking) conditions reaches the QWT, which suspends in both the oil and water phases. Tars and heavy oil in furnace effluent streams are also contained in the bottom section of the QWT. They are heavier than water and settle down. In the upper section of the QWT, lower MW hydrocarbons condense and separate as light oil. The combination of the tar, heavy oil, and polymers with the coke fines makes a gummy agglomerate that causes fouling and blockage of the trays and other internals.

Unsaturated reactive polymer precursors such as styrenes, indenes and dienes have appreciable solubility in the water phase, making them difficult to separate from the quench water using conventional separation techniques. Further, these components tend to polymerize when exposed to high temperatures encountered in downstream systems. Thus, it would solve a long felt need in the art if an effective method for removing these soluble components from the QW could be found.

In conventional systems, the condensed dilution steam/ hydrocarbons and circulating quench water from the QWT are phase separated in an Oil/Water Separator. In gas crackers this separation is difficult because of small difference in specific gravity and large potential for emulsion formation. Free and emulsified oil carried with the water to the low pressure water stripper (LPWS) and dilution steam generator (DSG) contain polymer precursors that cause fouling of these towers.

To minimize heavy oil/tar carryover with the QW to the LPWS and DSG one or more of the following traditional systems has typically been used in the past:

Addition of gasoline to enhance phase separation (emulsion breaking).

Hydro-cyclone.

Filter—Coalescer.

Dispersed Oil Extractor (DOX) system.

Induced Gas Floatation (IGF) system.

The Dispersed Oil Extractor (DOX) system is an industrial system used to remove emulsified oil and suspended solids from the quench water. The system consists of a primary granular media coalescer filled with a multi-layer of different size granular material, followed by a vertical coalescer filled with carbon media that further coalesce the oil. The oil coalescence is finished in a horizontal performax separator containing a matrix plate section and a separation section that allows the separation of the three phases (light oil, treated QW and heavy oil). This system does not remove dissolved hydrocarbons from the QW.

Strausser et al., U.S. Pat. No. 3,507,782, describes a process for the purification of plant process wastewater by separation of dissolved and emulsified hydrocarbon from aqueous media. The dispersed phase of stable emulsions comprising aromatic hydrocarbon-containing oils in aqueous media is de-emulsified by intimately contacting the aqueous media with small amounts of aromatic hydrocarbon solvent. This results in an oil-rich phase and an emulsified oil depleted aqueous phase, and passing the oil depleted aqueous phase through a finely divided crystalline silica coalescing medium to de-emulsify the dispersed phase of the remaining emulsified oil. This system does not remove dissolved hydrocarbons from the QW.

Yoshimura et al., U.S. Pat. No. 4,336,129, describes a method for treating water-containing waste oil and solid constituents and forming a water-in-oil emulsion, which comprises adding to the water-containing waste oil, a small amount of aromatic treating oil having an aromatic content of the treating oil must be greater than that of the waste oil in the water in order to break the emulsion. The water-containing waste oils generally taught for treatment by Yoshimura et al. '129, are typically those originating from coal tar plants, which have a large unsaturated hydrocarbon content with greater hydrophilic property than oils with reduced unsaturated hydrocarbon content. Accordingly they tend to form a water-in-oil emulsion. Solids present in these water-containing oil wastes comprise iron compounds, resinous matters comprising aromatic condensed ring compounds, coke powder, etc., swells about ten times of the volume of its dried state. The oil fraction contains mainly benzene homologues as light distillates, naphthalenes as medium distillates and tricyclic aromatic compounds such as anthracenes as heavy distillates. The specific gravity of the oil fraction is relatively close to that of water and it varies depending upon the composition of the particular oil. The specific gravity becomes smaller than water as the proportion of light distillate increases or as the temperature rises. This system does not remove dissolved hydrocarbons from the QW.

Jordan et al., U.S. Pat. No. 5,656,173, describes a method of removing dispersed oil from an oil-in-water emulsion by dissolved gas flotation. The steps involved include dissolving gas in water to form an aerated solution, and introducing the emulsion and aerated solution into a treatment vessel in which is positioned a coalescing media formed by an assembly of closely spaced corrugated plates of oleophilic material. The emulsion and aerated solution are passed in contact with the plates to cause oil droplets to coalesce on the plates. The small gas bubbles in the aerated solution adhere to the oil droplets to increase the buoyancy of the oil droplets so that the oil droplets rise more readily to the surface of the emulsion, and the accumulated oil is then removed from the surface. This system does not remove dissolved hydrocarbons from the QW.

Bibaeff, U.S. Pat. No. 4,800,025, describes a method for the dispersed gas flotation and separation of insoluble, dispersed contaminants from a liquid. The Bibaeff '025 apparatus is comprised of a horizontal series of flotation cells, separated by baffles that permit the substantially horizontal flow of liquid from one cell to the next. Each cell is equipped with one or more gas dispersing nozzles and screens that aid in the coalescence and flotation of the contaminant particles. Also, the Bibaeff '025 apparatus includes an inclined baffle above the horizontal series of cells to urge the floated impurities toward a weir positioned to remove the impurities from the surface of the liquid. This system does not remove dissolved hydrocarbons from the QW.

Cairo et al., U.S. Pat. No. 5,080,802, describes a method for flotation removal of suspended impurities by induced gas flotation. The apparatus induces maximum gas volumes consistent with optimum mass transfer of gas medium to suspended impurities in the liquid while controlling intercell or vessel chamber turbulence. The maximum gas induction without turbulence is achieved through the use of microscopic gas bubbles. Such microscopic gas bubbles provide massive surface area for the suspended impurities to adhere to and allow for utilization of an apparatus that is smaller and more compact for comparative treatment volumes. This system does not remove dissolved hydrocarbons from the QW.

Present quench water treating processes including the traditional filter/coalescer, DOX and the DGF address with some success the removal of the free insoluble oil from the quench water. All well designed units are capable of removing the free oil from about 500 wppm free oil content down to between 20 and 50 ppm free oil. None of these prior art processes, however, are capable of removing the dissolved oil that has a larger content of unsaturated hydrocarbons and polymer precursors from the QW. Because of the tendency of these components to foul downstream LPWS and DSG systems, it would represent a notable advance in the state of the art if a process that effectively removed these compounds were developed.

SUMMARY OF THE INVENTION

The present invention provides a process for removing substantially all organic material from a quench water stream, including the dissolved oils. That is, treatment of quench water in accordance with the method of this invention can reduce the content of organic contaminants to a level less than about 50 ppm, even less than about 10 ppm. Moreover, the four primary functional groups of contaminants (polymer precursors) being: conjugated dienes, carbonyls, styrenes and indenes may be reduced by this invention to concentrations approaching less than 2 ppm each. In treating a quench water solution having a quantity of organic material dissolved therein, the process of the present invention preferably provides for intimately mixing a wholly fresh or virgin water-immiscible organic extracting solvent by countercurrent flow with the quench water solution in a multi-stage liquid—liquid extractor at a temperature above ambient but preferably below 100° C.

In the highly efficient extraction preferred process of the present invention, polymer precursors contaminants, dienes, carbonyls, styrenes and indenes, are removed from the quench water to a level of 2.0 ppm or less each. There is, however, a finite solubility of the organic extracting solvent in the quench water solution. To remove this content of residual organic material from the extracted quench water, the quench water as raffinate from the solvent extractor, hereinafter referred to as "quench water raffinate," is subjected to steam stripping. The quench water raffinate enters the top of a steam stripping tower. The raffinate flows downward through the tower, while injected low pressure steam flows upward in the tower, and by altering the partial vapor pressure of the residual organics in the quench water raffinate, the steam removes residual organic material from the quench water raffinate stream. A pretreated quench water stream is thus provided that is substantially free of organic material and contaminants including any and virtually all monomeric polymer precursors that previously could not be removed by the prior art systems. The pretreated quench water stream then can be suitably used to generate steam in the dilution steam generation system without fouling.

The organic extracting solvent employed in the countercurrent, multistage contact extraction of the quench water is a "virgin" extracting solvent in the entirety of its volume used. That is, with respect to any volume of solvent that first comes into contact with a volume of quench water, no portion of this solvent volume has previously been in contact with a prior portion of quench water without also having first been completely regenerated to its virgin state by distillation. In other words, each volume of organic extracting solvent supplied to the extraction column is either passed through one time only or, if reused, is first completely regenerated to the absorption capacity of a virgin extracting organic solvent. This condition is essential to achieving an essentially less than 10 ppm total concentration of dissolved unsaturated polymer precursors in the quench water raffinate. Another necessary condition to achieve this low level of dissolved polymer precursors is that the solvent and quench water must be brought into contact while each is at an elevated temperature, that is a temperature greater than 25° C. and up to about 120° C., preferably while each is at an initial column input temperature of from 35° C. to about 120° C., and more preferably at a temperature ranging from about 50° C. to about 120° C.

It has been found that the counter-current flow contact of a quench water stream with a water immiscible solvent of a lower density under agitation and in multiple contact stages while both fluids are at greater than ambient temperature surprisingly substantially removes from the quench water solution substantially all polymer precursor constituents that processes heretofore either did not contemplate to exist and certainly did not to any substantial extent remove from the quench water stream.

Since a preferred extracting solvent is one rich in aromatics such as benzene, toluene and/or xylenes, to the extent that the quench water solution contains like aromatic constituents as contaminants, these will not be removed by the extracting solvent, and may even be somewhat enriched in the quench water raffinate. However, because the quench water raffinate produced in the present invention is of a low and/or essentially nil content of polymer precursors, the raffinate may be subjected to steam stripping distillation without concern for fouling the steam stripper operating surfaces with polymeric materials. The quench water raffinate may be steam stripped at subatmospheric, near atmospheric or superatmospheric pressure at bottom column reboil temperatures of from about 110° to about 130° C. or greater to remove residual aromatic constituents and further reduce the already low level of residual polymer precursors, all of which exit in the vapor overhead product of the steam stripping column.

The steam stripped quench water raffinate taken as a bottom product from the steam stripping column, hereinafter referred to as the "pretreated quench water" stream, will contain a total quantity of organic constituents which is on the order of less than 20 wppm and a quantity of polymer precursors of 10 wppm or less, generally less than about 5 wppm. The pretreated quench water is now suitable to be heated at high temperature and pressure used in the production of dilution steam without fouling the dilution steam generation equipment. The pretreated quench water, a product of the process of this invention, is free of such objections.

BRIEF DESCRIPTION OF THE DRAWING

A better understanding of the present invention can be obtained when the following detailed description is considered in conjunction with.

Figure 1:
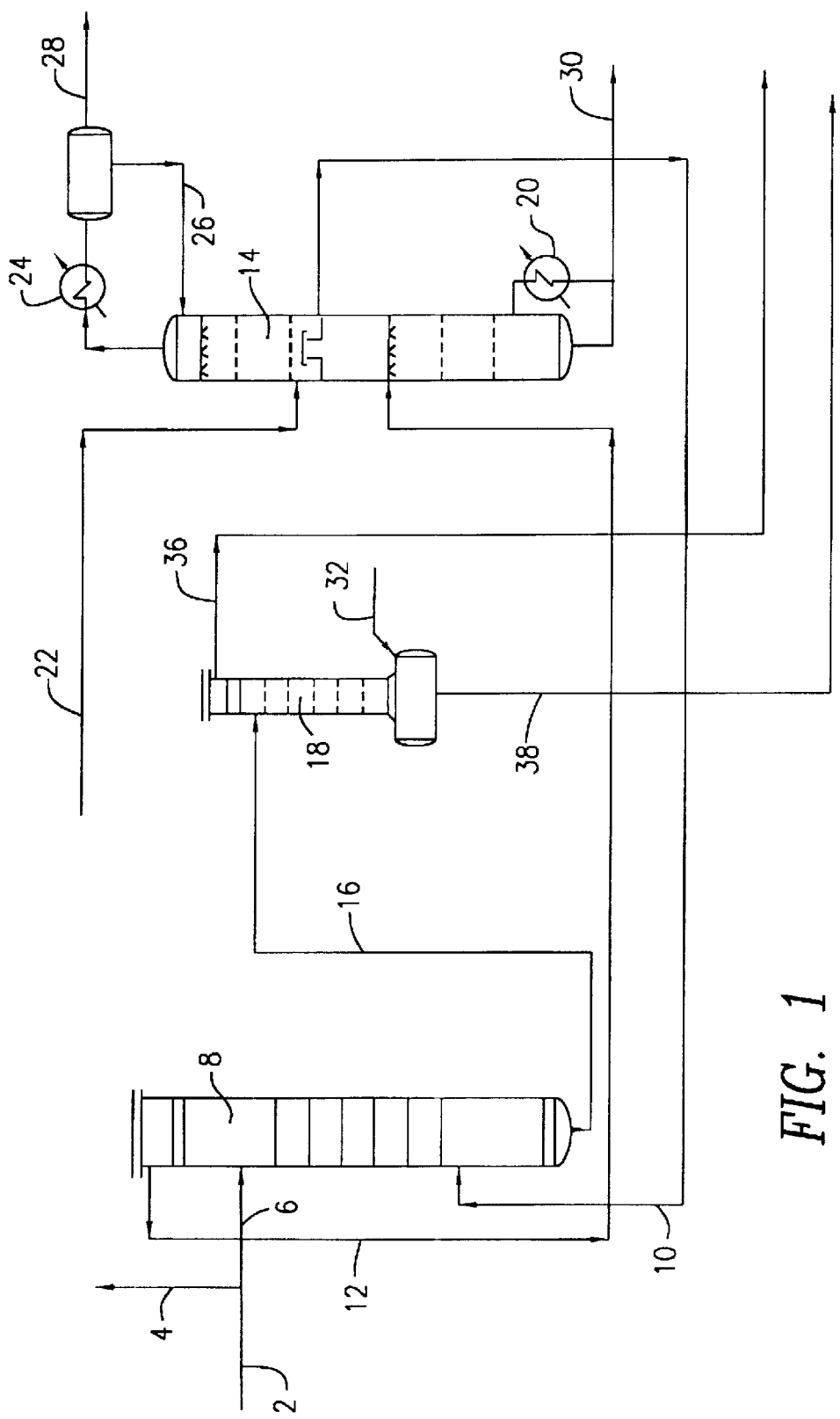
FIG. 1 which shows in a schematic form a preferred embodiment of the present invention.

However, these drawings and their detailed description set forth below, are for illustrative purposes only, and should not be construed to limit the scope of the appended claims in any manner whatsoever.

DETAILED DESCRIPTION OF THE PRESENT INVENTION

The design systems for ethylene plant production that include gas furnace cracking of the feed often include at least one conventional cleanup step for the quench water employed. However, for instance, the usual filter and coalescer steps employed in the past prior art systems do not entirely meet the higher standards and requirements for purification due at least in part to their inability to remove dissolved hydrocarbons from the QW. This deficiency is a result of not being able to operate the downstream stripper at high enough temperature due the presence of polymer precursors in the quench water; and is especially important with respect to benzene in the stripped water for which there are now strictly enforced specifications to be met in ethylene plants where the condensed dilution steam part of the quench water is rejected to the environment. Also, in ethylene plants that reuse this net quench water, the presence of polymer precursors causes undesirable fouling in the downstream water stripper and dilution steam generator.

In addition to the lower standards of the past, the various known and used treatment processes for the contaminated quench water recovered and recycled were and are variously and uniformly very expensive to install, require high and often critical and untimely maintenance efforts and costs, and also continual high operating costs.

As a result of these new requirements and the disadvantages of the prior art processes for obtaining them, it is an object of the present invention to provide a novel and innovative new process comprised of a heretofore unknown combination of process steps to meet the new requirements, overcome the deficiencies of the prior art, and unexpectedly satisfy a long felt need in the art. These steps basically comprise contacting a net quench water stream in a liquid—liquid extraction unit with an extracting solvent, and stripping the extracting solvent from the QW. The bottoms from the water stripper are the pretreated quench water that is suitable for either discharge to the environment or is reused to generate dilution steam. In addition to having cost and maintenance advantages, the novel process of the present invention requires less operational costs, less running time and gives superior product having the desired properties for use or discharge.

The conventional ethylene plant operation is equipped with a quench water system that operates from a QWT. The used recirculated quench water from the plant contains up to 10 wt % oil from the reaction system. A phase separation process in a conventional O/WS first separates the oil. The resulting water is passed through a strainer to filter out the coarse solid particles, after straining, the water is saturated with hydrocarbon components of the separated oil phase, and contains 100 to 1000 wppm of fine oil droplets, 100–500 wppm of dissolved oil, and residual fine solid coke particles.

A high percentage, up to 75–90%, of the water from the O/WS is recirculated and returned to the QWT. The net quench water may then be passed through a fine filter (about 50 microns) to remove from 80–90% of the suspended solids therefrom.

The resulting oil-separated, filtered water is subjected to liquid—liquid extraction, preferably counter-current; using an aromatic rich $C_6$–$C_8$ hydrogenated gasoline extracting solvent or other suitable extracting solvent, such as BTX or toluene. This extraction with additional oil unexpectedly functions to extract the polymer precursors and heavy hydrocarbons from the water phase.

Following the extraction, the substantially polymer precursor free water, which is now saturated with the components of the $C_6$–$C_8$ hydrogenated gasoline extracting solvent, is passed to a low-pressure steam stripper unit. Because the stream is substantially polymer precursor free, the stripper can operate at higher temperatures and thereby remove the volatile organic compounds (VOCs) without fouling the stripper or other downstream equipment. Operating thus and employing these clean-up steps for the net quench water, the stripped water that results is free from subsequent fouling in downstream steam generators and, also, is entirely within the environmental required benzene specification limits of <50 wppb for discharge to the environment.

This resulting stripped water is passed to a dilution steam generator wherein steam is generated with no appreciable fouling of the system. It is also important that water blow down is significantly minimized by this treatment as a result of the lower percentage of hydrocarbons heavier than toluene that are present in the water after it has been subjected to the liquid—liquid extraction. This enables simplification of the equipment required in the DSG, i.e., only a boiler is necessary instead of a boiler and column as required by the prior art systems.

Advantages of the process of the present invention include effective and substantially complete removal of the dissolved heavy hydrocarbons and polymer precursors from the water phase and also the merging, and mixing of the fine oil droplets in the used net quench water with the hydrogenated gasoline extractant stream.

In plants cracking heavier feedstocks, the effluent gas stream from the cracking furnace of the olefin plant is generally passed to an oil quench unit. In plants that use only gas feedstocks (ethane, propane and butanes), the oil-quenching step is not required because the low molecular weight feedstocks do not yield sufficient amounts of liquid components at the 200° C. or higher temperatures employed. In these systems, the cracking furnace effluent is passed directly to QWT.

The cooled furnace gas from the TLE exchangers is passed into the quench water tower where it is further cooled by direct contact with circulating quench water. This results in condensation of a major portion of the steam, heavy oil, light oil and part of the light hydrocarbons present in the gas. Coke fines and other solids present in the furnace cracked gas are also deposited in the quench water.

In addition to being fed with furnace cracked gas (oil quenched or not), the quench water tower is also a dump for many other recycled continuous and intermittent streams that may cause changes in the surface properties of the water as well as its pH. A low pH (<4.5) or a high pH (>9.5) makes it difficult to separate the emulsified oil. Exemplary of the other feedstreams that may dump into the quench water tower, include, but are not limited to, one or more of the furnace effluent streams and blow down during heater regeneration; drips from the charge gas compressor system with knock out drums; depropanizer and debutanizer drains; liquid from wet flare drum; chemicals returned to the quench tower from an ammonia removal section, water from regeneration inline separator; quench water stripper overhead; hydrocarbon drips from compressor drips transfer pump; and/or start-up reactor recycle line that flow from the acetylene reactor recycle heater. In addition, there are streams that come from the various knockout drums throughout the unit. Any process that is selected for quench water treatment and quench water/oil separation will be impacted by the properties and content of the cracked gas as well as the other streams entering the quench water tower.

As mentioned above, the pH of a system to be treated may vary greatly and this will need to be controlled to separate effectively oil and water. The pH is in large part dependent on different factors including composition of the feedstock, the type of furnace used and conditions such as residence time and temperatures employed in the furnace. If high severity low residence time furnaces are used with a short run length, then controlling the pH in the tower bottoms is more difficult than if the furnaces are medium residence time. This is because, with a small tube in a short residence time furnace, it is imperative that coke laydown on the tube be reduced. To reduce coke laydown, continuous sulfiding is practiced, which, if not properly controlled may cause a low pH or a varying pH in the quench water tower bottoms. A longer run length causes frequent furnace decoking that makes stabilization of pH in the quench water tower bottoms more difficult. At pH conditions below 4.5 and about 9.5, there is increased difficulty in separating the emulsified oil. Also, a low pH can cause an increase in corrosion and a high pH makes the system more predisposed to foaming and more difficult to separate the oil and water fractions. The pH can be controlled either by an inline pH control method or by using a holdup vessel such as an equalizing tank as is known to those skilled in the art.

As to the contaminants and unwanted products in the cracked gas stream that are present and may reach the QWT, they include spalled coke particles and coke fines from the cracking furnace. Typically, the size of the coke fines ranges from about 1–200 microns and they suspend in both the oil and water phases. Tars and heavy oils are also present in the furnace-cracking stream. The tar is heavier than water and therefore settles. However, while the heavy oil is heavier than water, its density difference is relatively small and its separation is more difficult.

The cracked gas that contacts the quench water in the upper section of the quench water tower causes the condensation of lower molecular weight hydrocarbons, which separate as light oil.

There can also be chemical additives present in the process of the present invention. These may be various emulsion-breaking compounds, chain controlling and stopping agents and/or charged ionic elements that will attract oil molecules as are known to those skilled in the art. These additives may be volatile and can be stripped by steam in the stripper or they may be heavier so that they do not build up in the system because of recycle. The proper addition of these chemicals can increase recovery of oil and grease from 95% up to 99% or more, which is a significant advantage. However, an excess of these chemical additives may cause foaming and an insufficient amount may hamper the recovery of the emulsified oils.

The cracked gas stream is composed of many different hydrocarbon components among which are unsaturated reactive components that have appreciable solubility in the water phase. These components will polymerize when exposed to high temperatures and increasing pressure such as those conditions that are encountered in the water stripper and dilution steam generator. Typical and well-known polymer precursors found in the quench water are styrene, indene, the dienes and various other unsaturated monomers.

The bottom stream of the quench water tower consists of saturation water carrying heavy oil and tar components together with a relatively small amount of light oil components. This stream is passed to an oil/water separation unit. The tar present is allowed to separate by settlement in the first section of the separator unit. The heavy oil is separated from the water in a next following compartment and removed.

Referring to FIG. 1, deoiled (oil separated) quench water in line 2 from the oil/water separator (not shown) contains dissolved, emulsified and separated oil and also some tar and solids. The stream is filtered in a strainer (not shown) to separate and remove the coarse solid particles, >600 micron size.

After filtration, the quench water may be split into a stream 4 and a stream 6. Stream 4 is circulated to users (various services) that utilize the hot quench water for heating and then returned as cold quench water to the QWT. Stream 6 is the net quench water, which is fed to an extraction tower 8 where it is contacted with an extraction solvent, such as stabilized, hydrogenated, aromatic-rich gasoline, preferably the $C_6$–$C_8$ cut, or with toluene, or a mixture thereof, fed to an extraction tower via a line 10. This extraction removes from the quench water the polymer precursors such as styrenes, indenes and dienes that would polymerize if and when subsequently exposed to high temperatures in the downstream water stripper and the dilution steam generator.

Preferably the liquid—liquid extraction column 8 or other similar contact zone operates to countercurrently contact the net quench water and extraction solvent that reduces emulsion formation. The extraction tower 8 preferably operates at a pressure ranging from about 2 to about 10 bar gauge and a temperature ranging from about 50 to about 120° C. The extraction unit may be a multistage mixer-settler type or a tower of the plate type or may include a packing material. The function of the liquid—liquid extraction step is to effectively transfer the polymerizable styrenes, indenes, dienes, carbonyls, and heavy organic molecules from the water phase to the extracting solvent phase. By the extraction step, more than about 90% and preferably more than about 95% of the polymeric materials and polymer forming styrenes, indenes, dienes and aromatic vinyl compounds are removed. The spent extracting solvent passes out of the upper part of the tower 8 via a line 12 and is then passed to the extracting solvent regenerator unit 14 for recovery. The resulting, extracted quench water is removed from the bottom of the extraction tower via a line 16 and fed to the top of the water-stripping unit 18.

The spent extracting solvent is regenerated in extracting solvent regenerator 14 that comprises a fractionation column 14 equipped with reboiler 20. Reboiler 20 is preferably heated with desuperheated middle pressure steam, and is preferably a thermosiphon reboiler. The regenerator 14 operates at a pressure ranging from about 400 mm Hg to about 1 bar gauge and a temperature ranging from about 100 to about 160° C. Regenerated extracting solvent is removed from a middle section of the tower 14 via recycle line 10. Make up extracting solvent may be added to the top of the tower via a line 22. Light hydrocarbon precursors are condensed in condenser 24, preferably water cooled, for use as reflux in a line 26 or for return to the quench tower (not shown) via a line 28. The bottoms comprising heavy hydrocarbons including polymers are removed via a line 30 for routing to the tar drum (not shown) for disposal.

The net quench water while in contact with the extracting solvent in the extraction tower 8 becomes saturated with the aromatic components of the extracting solvent. These are stripped out in the hydrocarbon stripper 18. The steam stripping of the extracted quench water results in the removal of essentially 99.9% of the benzene and light materials and more than 99% of the toluene. The stripper unit 18 is preferably a 10 to 20 tray column that utilizes low-pressure steam added from a line 32 as the vapor phase for stripping.

The stripper 18 is operated at a temperature ranging from about 125° C. to about 145° C. to provide improved VOC removal. Higher temperatures may be employed in the stripper 18 than in prior art strippers, without fouling, to affect improved benzene and toluene removal, because of the removal of the polymer precursors in the upstream extraction tower 8. Sufficient pressure, from about 2 to about 3 bar gauge, is maintained in the stripper unit to recycle the overhead vapor comprising stream and hydrocarbons to the quench water tower in a line 36. The stripped bottoms are the treated quench water (pretreated quench water) and are removed by a line 38. The pretreated quench water is essentially free of polymer precursors with <10 ppm total dienes, styrenes and indenes. This water can be discharged safely to the environment or reused to generate steam without fouling the downstream dilution steam generation system.

The process of the present invention thereby provides an effective improved method of cleaning quench water. The process of the present invention eliminates the need for the expensive coalescing equipment of the prior art.

Figure 2:
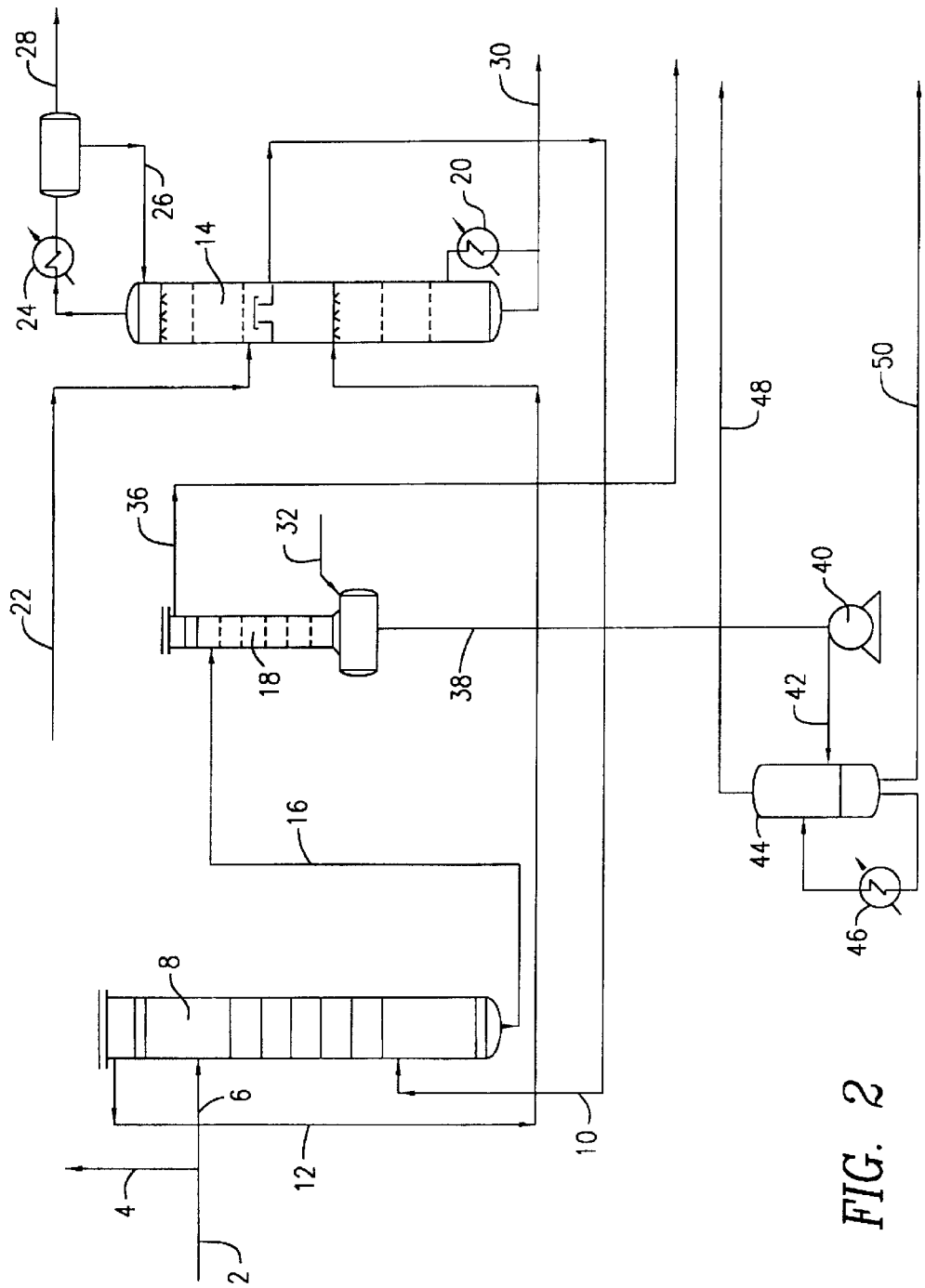
FIG. 2 which shows in a schematic form another preferred embodiment of the present invention.

In embodiments where it is desired to include dilution steam generation, the present invention also provides an improved process for generating dilution steam. The reference characters for FIG. 2 represent the same stream or equipment as for FIG. 1. Referring to FIG. 2, the treated quench water in a line 38 is pumped via a pump 40 to dilution feed stream 42 into dilution steam generator drum 44. The treated quench water from dilution steam generator drum 44 is heated to generate steam in boiler 46. The steam is returned to dilution steam generator drum 44, where condensates and any contaminants fall to the vessel bottom. Dilution steam is withdrawn from the top via a line 48. Blowdown is removed via line 50. Because of the relative purity of the feed to the DSG, the blowdown is substantially reduced, and instead of a trayed column and boiler, only a drum and a boiler are required to produce dilution steam in accordance with the present invention.

EXAMPLE

As an example, a computerized material balance is run on the system of FIG. 2. The results are tabulated in the Table below. From the table it is readily seen that substantially all of the styrene, indene, carbonyls and dienes, the polymer precursors, are removed during the extraction and are present only in very low amounts in the extractor raffinate stream 16. Further, the benzene content of the stripper bottoms, stream 38, is 0 wppm. The dilution steam in stream 48 is substantially pure water.

What is claimed is:

1. A process for cleaning condensed furnace dilution steam portion of a quench water stream comprising greater than about 100 weight parts per million dissolved polymer precursor organic compounds, said process comprising the consecutive steps of:
   (a) contacting said portion of quench water stream with an extracting solvent comprising fully hydrogenated hydrocarbons in a multi-stage liquid—liquid extractor to produce a quench water raffinate comprising less than about 20 weight parts per million of said dissolved polymer precursor organic compounds and rich in said fully hydrogenated hydrocarbons and spent solvent rich in said dissolved polymer precursor organic compounds;
   (b) withdrawing said quench water raffinate from one end of the extractor; and
   (c) steam stripping said quench water raffinate in a steam stripping unit to remove substantially all of said fully hydrogenated hydrocarbons from said quench water raffinate to provide a pretreated quench water stream.

2. A process as defined in claim 1 wherein said pretreated quench water stream is suitable for reuse to generate dilution steam without fouling.

TABLE

| | STREAM ID | | | | | | | | | | | |
|---|---|---|---|---|---|---|---|---|---|---|---|---|
| | 2 | 10 | 12 | 16 | 22 | 32 + 12 | 28 | 30 | 36 | 38 | 48 | 50 |
| | STREAM NAME | | | | | | | | | | | |
| COMP.,WPPM | Extractor QW Feed | Extractor Solvent FD | Extractor Extract | Extractor Raffinate | Solvent Make-up | Regen. Feed | Regen. OVHD | Regen. BTMS | Stripper OVHD | Stripper BTMS | DSG OVHD | DSG BTMS |
| 1 H2O | 996934 | 1759 | 2087 | 999381 | 0 | 2081 | 165439 | 0 | 987626 | 999969 | 999968 | 999996 |
| 2 C2 and Lighter | 65 | 0 | 106 | 11 | 0 | 106 | 52928 | 0 | 249 | 0 | 0 | 0 |
| 3 C3's | 28 | 28 | 28 | 28 | 28 | 28 | 28 | 0 | 28 | 0 | 0 | 0 |
| 4 BUTADIENE | 51 | 2 | 104 | 0 | 0 | 104 | 50784 | 0 | 0 | 0 | 0 | 0 |
| 5 C4's SATURATED | 4 | 4 | 4 | 4 | 4 | 4 | 4 | 0 | 4 | 0 | 0 | 0 |
| 6 CYCLO-PENTADIENE | 32 | 53 | 113 | <2 | 0 | 113 | 30170 | 0 | 24 | <2 | <2 | 0 |
| 7 1PENTENE | 6 | 2 | 12 | 0 | 0 | 12 | 5444 | 0 | 0 | 0 | 0 | 0 |
| 8 2METHYL HEXANE | 0 | 1 | 1 | 0 | 0 | 1 | 58 | 0 | 0 | 0 | 0 | 0 |
| 9 BENZENE | 524 | 61541 | 61885 | 188 | 0 | 61870 | 487422 | 413 | 4188 | 0 | 0 | 0 |
| 10 TOLUENE | 78 | 935962 | 930598 | 346 | 54255 | 930584 | 184822 | 422490 | 7696 | 0 | 0 | 0 |
| 11 OXYLENE | 105 | 272 | 478 | 0 | 923460 | 500 | 0 | 29901 | 2 | 0 | 0 | 0 |
| 12 C9-400F | 1454 | 46 | 2918 | 0 | 11253 | 2912 | 0 | 375355 | 0 | 0 | 0 | 0 |
| 13 LFO C14 – C24 | 468 | 0 | 924 | 0 | 0 | 922 | 0 | 120723 | 0 | 0 | 0 | 0 |
| 14 HFO C26 + TAR | 90 | 0 | 177 | 0 | 0 | 177 | 0 | 23115 | 0 | 0 | 0 | 0 |
| 15 ETHYL BENZENE | 4 | 246 | 253 | 0 | 0 | 275 | 1 | 4204 | 1 | 0 | 0 | 0 |
| 16 STYRENE | 21 | 35 | 77 | <2 | 11000 | 77 | 0 | 5453 | 1 | <2 | 0 | <2 |
| 17 PHENOL | 53 | 8 | 40 | 36 | 0 | 40 | 0 | 4312 | 72 | 31 | 31 | 2 |
| 18 ISOPRENE | 24 | 22 | 68 | 1 | 0 | 68 | 22897 | 0 | 12 | 0 | 0 | 0 |
| 19 INDANE | 4 | 0 | 9 | 0 | 0 | 9 | 0 | 1139 | 0 | 0 | 0 | 0 |
| 20 NAPHTHA-LENE | 6 | 0 | 12 | 0 | 0 | 12 | 0 | 1536 | 0 | 0 | 0 | 0 |
| 21 CARBONYLS | 4 | 17 | 17 | 4 | 0 | 17 | 3 | 0 | 97 | 0 | 0 | 0 |
| 22 INDENE | 44 | 1 | 88 | <2 | 0 | 88 | 0 | 11359 | 0 | <2 | 0 | <2 |
| RATE, LB/HR | 147684 | 74392 | 74781 | 147295 | 150 | 74931 | 150 | 572 | 6620 | 157374 | 157194 | 180 |
| TEMP, F | 178.2 | 191.2 | 178.4 | 179.9 | 100.0 | 184.7 | 141.9 | 290.0 | 242.1 | 246.4 | 373.1 | 374.0 |
| PRES., PSIA | 70.0 | 70.0 | 50.0 | 68.0 | 25.0 | 20.0 | 18.0 | 20.0 | 26.0 | 28.0 | 180.0 | 182.0 |
| MOLE WEIGHT | 18.06 | 90.49 | 90.46 | 18.02 | 91.52 | 90.46 | 46.64 | 111.52 | 18.19 | 18.02 | 18.02 | 18.02 |
| WT FRAC VAPOR | 0.0 | 0.0 | 0.0 | 0.0 | 0.0 | 0.0 | 1.0 | 0.0 | 1.0 | 0.0 | 1.0 | 0.0 |

The above-mentioned patents are hereby incorporated by reference. Many variations of the present invention will suggest themselves to those skilled in the art in light of the above-detailed description. All such obvious variations are within the full-intended scope of the claimed invention.

3. A process as defined in claim 2 wherein said dilution steam is generated in a dilution steam generator consisting essentially of a drum and a boiler.

4. A process as defined in claim 1 wherein said pretreated quench water stream is suitable to be discharged safely to the environment.

5. A process as defined in claim 1 wherein said extractor comprises a multistage mixer-settler unit or a countercurrent extraction column equipped with trays or packing.

6. A process as defined in claim 1 wherein said extractor is operated at a pressure ranging from about 2 to about 10 bar gauge and a temperature ranging from about 25 to about 120° C.

7. A process as defined in claim 6 wherein said extractor operating temperature ranges from about 50 to about 120° C.

8. A process as defined in claim 1 further comprising recovering solvent from said spent solvent by regenerating the spent solvent in a solvent regenerator; said solvent regenerator comprising a distillation tower; wherein said spent solvent regeneration comprises feed spent solvent to said solvent regenerator, purging a light overhead stream, purging a heavy bottom stream, and removing a heart-cut side stream comprising regenerated solvent for recycle as solvent to the extractor.

9. A process as defined in claim 8 wherein said solvent regenerator is operated at a pressure ranging from about 400 mm Hg to about 1 bar gauge and a temperature ranging from about 100 to about 160° C.

10. A process as defined in claim 8, further comprising adding fresh solvent make-up stream to the recycle solvent stream for offsetting solvent losses.

11. A process as defined in claim 1, wherein said steam stripping unit comprises provision to receive stripping steam at the bottom or a reboiler for heating the quench water raffinate stream to produce steam; and a stripper receiving said quench water raffinate stream at an upper end.

12. A process as defined in claim 11 wherein said stripping is effected at a temperature ranging from about 100° C. to about 150° C.

13. A process as defined in claim 12 wherein said stripping temperature ranges from about 125° C. to about 145° C.

14. A process as defined in claim 1, wherein said steam stripping step further comprises purging organic material from the quench water raffinate stream as an overhead stream from a steam stripping tower.

15. A process as defined in claim 1, wherein said extracting solvent comprises an organic stream of greater than 50 weight percent aromatic hydrocarbon content.

16. A process as defined in claim 1, wherein said extracting solvent is selected from the group consisting of C6–C8 hydrogenated gasoline, BTX, toluene and mixtures of the foregoing.

17. A process as defined in claim 1, wherein said solvent comprises benzene, toluene or xylenes.

18. A process as defined in claim 1, wherein said solvent comprises at least about 95% toluene.

19. A process as defined in claim 1, wherein said solvent comprises at least about 95% benzene.

20. A process as defined in claim 1 wherein said portion of quench water comprises quench water exiting an upstream oil/water separator.

21. A process as defined in claim 1 wherein said quench water is filtered to remove residual suspended solids upstream of said extractor.

* * * * *